Dec. 31, 1929.   C. E. WHITE   1,741,216
PLANTING MECHANISM
Filed March 18, 1918   3 Sheets-Sheet 1
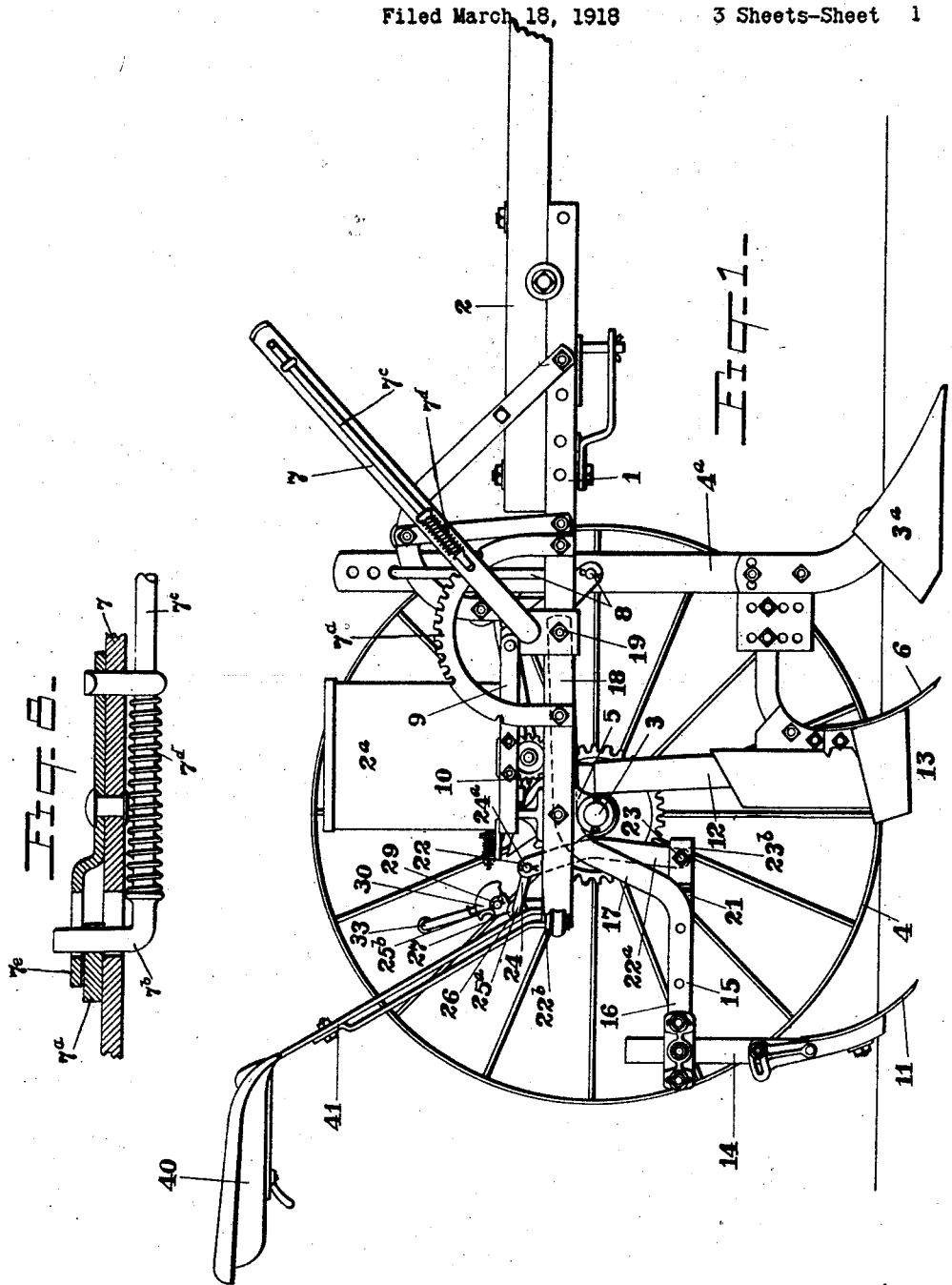

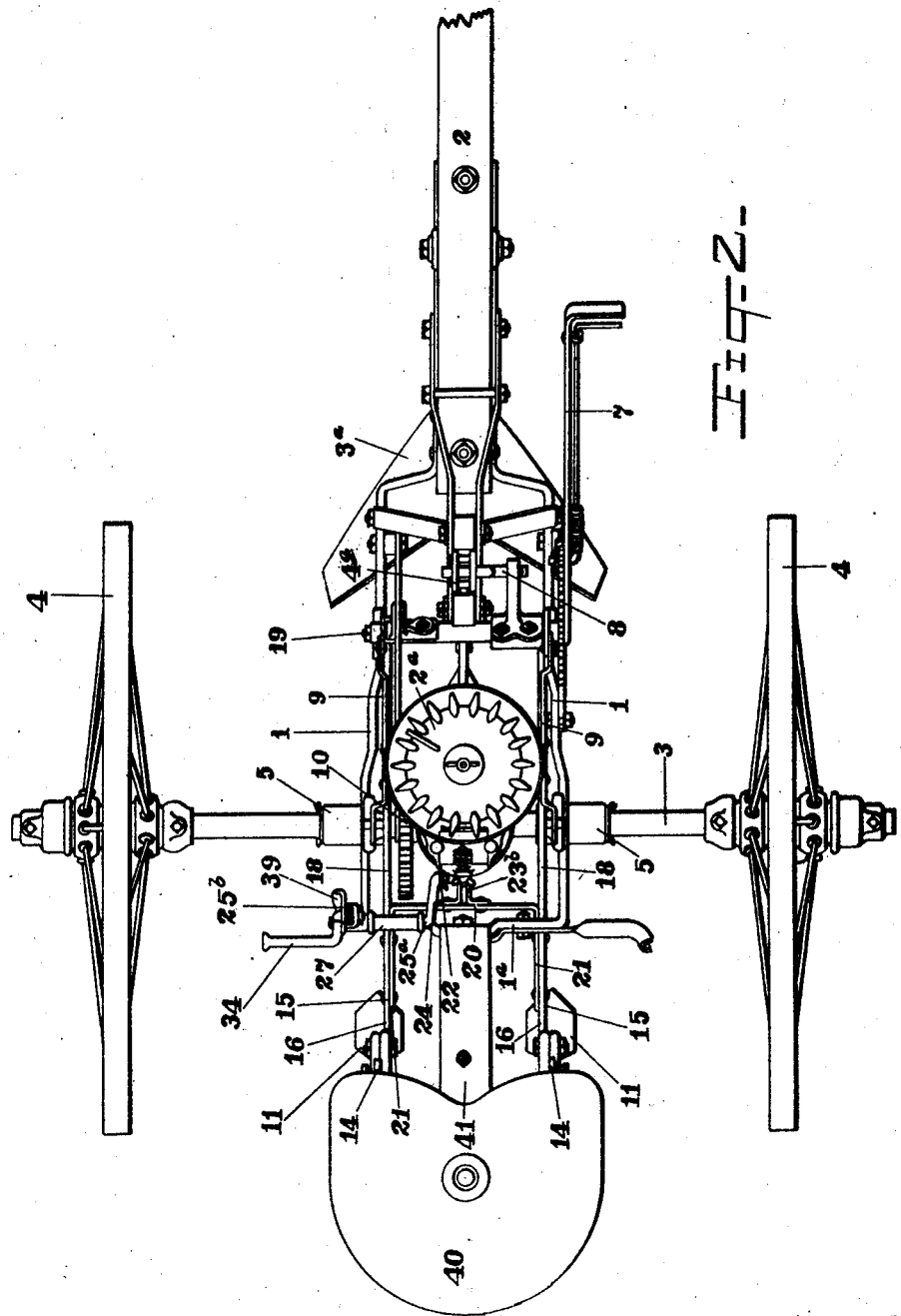

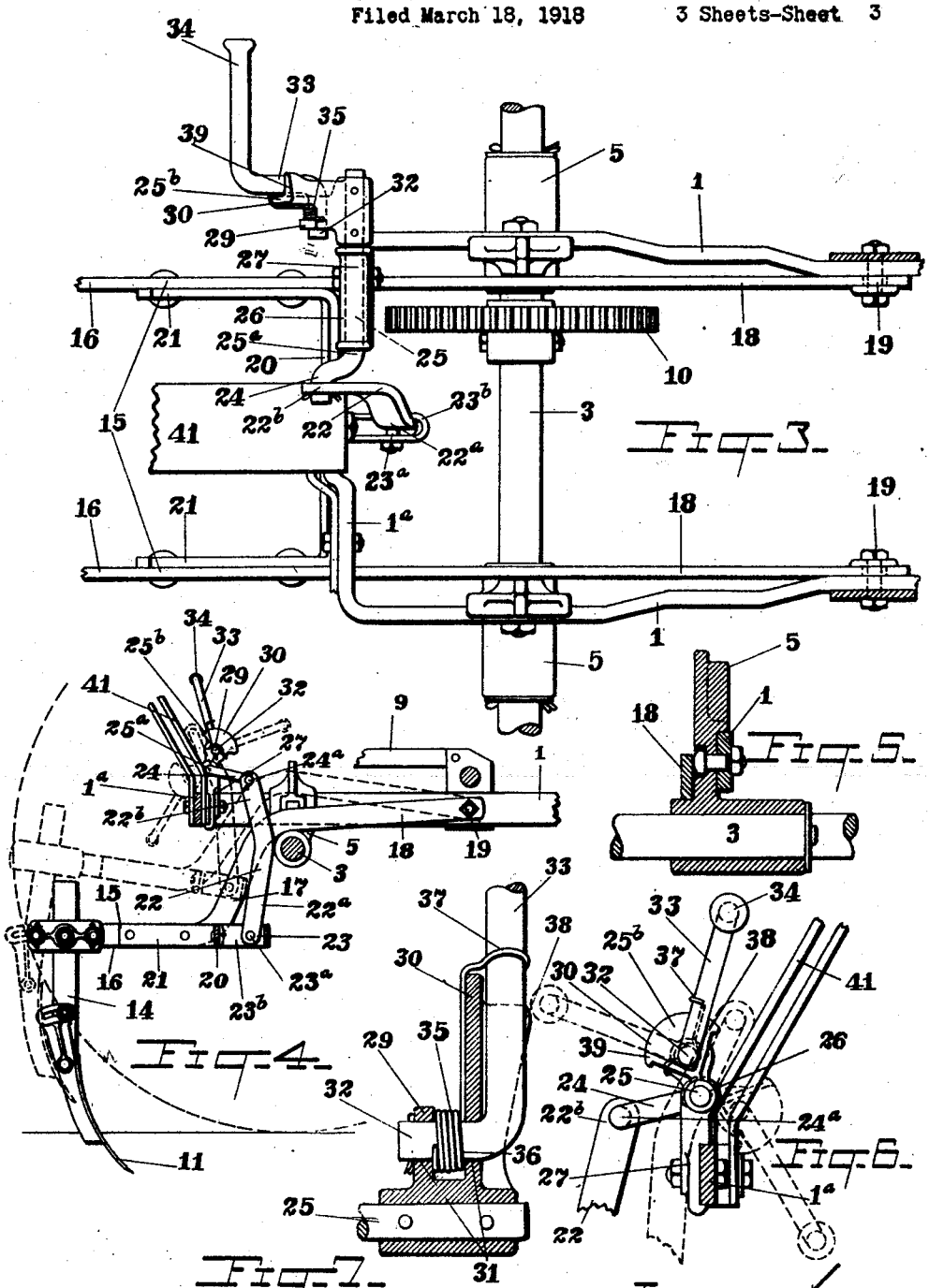

Patented Dec. 31, 1929

1,741,216

UNITED STATES PATENT OFFICE

CHARLES E. WHITE, OF MOLINE, ILLINOIS, ASSIGNOR TO DEERE & COMPANY OF MOLINE, ILLINOIS, A CORPORATION OF ILLINOIS

PLANTING MECHANISM

Application filed March 18, 1918. Serial No. 223,154.

This invention relates to improvements in farm implements of the sort in which use is made of working tools (for example, seed covering hoes, cultivator shovel and the like) which at times should be fixed for working continuously on predetermined horizontal lines; and at other times are to be lifted to and automatically locked in elevated positions, where they are inactive.

The present improvements are particularly well adapted for use in implements employed in planting seeds in fields in whose surfaces are formed trenches and ridges. These implements comprise a compact stiffly constructed frame rigid with the draft pole and supported vertically stationarily on two wheels. On the frame are mounted the vertically adjustable carriers of a plow sweep, a furrow-opener and a seed carrying and delivering mechanism. The carriers for these operative parts are connected together, so as to be simultaneously adjustable vertically in horizontal parallelism. The frame and all of the parts connected thereto must be capable of resisting powerful lateral thrusts and torsional reaction exerted by the hard surface earth upon the plow sweep and of holding the mechanism firmly to line.

Machines of this class must be provided with seed covering, and soil pulverizing devices positioned in the rear of the seed depositing devices. Heretofore these covering devices or cultivating shovels have been mechanically connected to the sweep, furrow opener and seeder, in such a way that the hoes were automatically raised or lowered simultaneously with the other parts. But I have found that with a planting mechanism of this sub-class while being operated in a soil of the sort specified, much better results can be obtained if the covering hoes or shovels are mounted independently of the devices which lower and lift the sweep and the other forward parts, and also are mounted in such way that they normally float, or in other words can move vertically automatically without hindrance, except such as the operator may interpose through pressure on the lever 33, through the range of their positions normally occupied when at work, and coincidently, so that they can be adjusted independently of the sweep and the seeder at any time at the option of the operator, to permit him to readily modify the action of the hoes to correspond with the hardness or other characteristics of the soil without requiring him to open any lock or release any holder while they are in said working range. And a machine embodying my improvements is shown in the drawings.

Fig. 1 is a side elevation of a mechanism embodying my improvements.

Fig. 2 is a plan view.

Fig. 3 is a view, partially in horizontal section, and partially in plan, showing parts of the frame, and also the foot-lever system for adjusting the hoes.

Fig. 4 is a view, partly in vertical section, partly in side elevation, showing one of the hoes, its support, and the lifting mechanism.

Figs. 5, 6, 7 and 8 are details.

There is a main frame provided, having the cross-bar 1ª and the side longitudinal bars 1, 1, extending from the cross-bar forward to, and secured to, the tongue 2. The frame is mounted upon the axle 3, and, upon the latter, at its ends, are mounted the ground-wheels 4, 4. The axle rotates in bearings 5, secured to the main frame-bars.

The machine illustrated is, or may be, of any of the now well-known forms, as concerns the construction and the relations of the tongue, the main frame 1, the seed-carrying-and-delivering mechanism at 2ª, the plow or sweep 3ª, the sweep-standard 4ª, the furrow-opener 6, the plow-lifting lever 7, the connecting devices at 8, the support 9 for the seed-holding-and-delivering devices, and the separable gearing at 10, these being characteristic of planters of this sub-class.

The framework is strong and rigid, and connected up to the wheel frame or axle as closely and firmly as possible. The wheels roll in two of the trenches, and are positioned to resist the thrusts and torsional strains which are exerted upon them and upon the frame by the plowing device or sweep 3ª as it is forced through the compact hardened soil at the tops of the ridges. It shaves off this top soil and delivers it again to the trenches, leaving a flat surface of fresh, pulverulent earth susceptible of having a seed-furrow formed therein, and of having the seed advantageously deposited in such furrow. The furrow-opener 6 extends, adjustably, to a horizontal plane below that at the bottom of the sweep 3ª and opens a furrow of a depth determined for the particular seed, the conditions of the soil, and the like.

When the operator desires to adjust the position of these devices for variations in work, he, by lever 7, and the connecting crank and link devices at 8, lifts or lowers the standard 4ª thereby positioning the sweep 3ª and the furrow-opener 6 as required. When he desires to throw these parts and the seeder out of operation, he, by the same lever, elevates the sweep and the opener to points above the surface, and during this movement throws the seeder-carrier at 9 upward far enough to separate the driving gears at 10, one of the gear-wheels being mounted on, and driven by, the axle. He locks the parts just specified in the desired position of adjustment (independently of the other operative elements to be described) by means of the segment 7ª, the detent 7ᵇ at the end of the rod 7ᶜ, which are normally pushed inward by spring 7ᵈ, the lever having a brace plate 7ᵉ on the inside of the segment 7ª, through a slot in which the detent finger 7ᵇ passes, as shown in Figs. 1 and 8.

The devices which are employed for closing the furrow, covering the seed, and pulverizing the adjacent soil are the hoes or shovels at 11, one on each side of the seed deposited from the tube 12 at 13. Each hoe is carried adjustably by a standard 14, and each standard is connected to a drag-bar, indicated as an entirety by 15, and formed to have a lower rear part 16, an inclined part 17 and an upper, approximately horizontal part 18. The part 18 lies above the axle 3, and extends forward some distance along the inner face of the side-bar 1 of the main frame, and its inner end is secured to the frame by horizontal pivot 19. The two drag-bars 15 are connected together rigidly by a cross-frame, having arms 21 riveted to the drag-bars, and an integral cross-bar 20.

22 is a link bar the lower end 22ª of which is pivoted at the axis 23ª to the hoe frame by the pivot at 23. Short bracket bars 23ᵇ are secured to the cross bar 20 to effect this pivotal connection.

The link 22 extends up to and is pivotally connected at the axis 24ª to a crank arm 24. The crank is part of or carried by a rock shaft 25, mounted on the axis 25ª in a sleeve bearing 26, which is part of a bracket casting 27, bolted to the cross frame bar 1ª. To the outer end of the rock shaft 25 is rigidly secured a casting formed with one or more projecting arms, as at 29 and 30, in which there is a bearing, in apertures 31, and in this bearing is mounted the journal part 32 of a foot lever 33. The radius part or lever proper, 33, is at right angles to the journal part and it extends from the latter to the pedal arm 34. 35 is a spring, one end of which is coiled at 36, around the journal part 32 of the foot lever, and the other end of which, at 37, is coiled around or bent to provide loop engagement with the radius part 33 of the foot lever. This radius part lies between two flanges or lugs 38, 39 on the expanded arm part 30 of the casting, and it can vibrate between these flanges or lugs, as limits, without moving the rock shaft 25; but if the foot lever is pushed still further after contacting with one of the flanges or lugs 38, 39, the entirety of the rocking device swings on the axis of the shaft 25. The foot lever 33 is normally held against lug 38 by the said spring 35; but the operator by his foot can easily push the lever against the springs and carry it over to the lug 39. The driver's seat is indicated by 40, it being supported on a standard 41, which extends downward at an inclination, and forward to the rear cross bar 1ª of the frame, to which it is rigidly secured. The link 22 is positioned in front of the seat standard and the latter serves as a stop against the backward movements of the link; but in lieu of this any suitable stop can be provided.

The hoes are held down against any tendency on their part to rise upward while they are at work by the operator applying pressure to the foot lever 33. When the crank 24 is rocked far enough to cause the axial line at 24ª to swing backward close to the plane passing through the axes at 23ª and 25ª, as shown in full lines in Fig. 4, the driver has a good foot leverage for holding the hoes to their work. If the soil and other conditions be such that it is desirable to permit the hoes to yield when at work, the driver can allow them to rise and fall somewhat, under the control of his foot, that is to say, he does not push down with sufficient force to hold the axis 24ª close to the specified plane.

As has been explained, the normal position of the foot lever 33 with respect to the casting is that shown in full lines in Figure 4 to which position the spring 35 tends to move it, but it may easily be pushed forward against the tension of said spring, as no appreciable downward pressure is applied to the hoes until said lever engages the lug 39. When this occurs the lever is in a more advantageous position for applying downward pressure to the hoes, so that the operator can easily control the operating depth thereof.

When he desires to lift the hoes and their frame to their uppermost position, where they are inactive, he relaxes the pressure of his foot on said lever, whereupon the spring 35 restores it to its normal position against the lug 38, which places it in an advantageous position to be pushed backward and downward by the pressure of the operator's foot, the result of which is to cause the crank 24 and the upper end 22$^b$ of link 22 to swing forward and upward until the axis 24$^a$ reaches its highest line of movement and then, the parts being related as shown, the axis 24$^a$ moves down and back a distance far enough for it to cross the plane of the axes 23$^a$ and 25$^a$, bringing the upper end 22$^b$ of the link 22 or the crank 24 against the cross frame bar or against the driver's seat standard as an abutment or stop. Thereafter the link is prevented from descending and the hoes and their frame are locked in their inactive position.

It will be seen that during the range of all of the working positions the hoes and the hoe frame are normally free and accommodate themselves to the conditions that are present and the operator need not actuate the lever 33 except when he wishes to move the hoes to a higher or lower position than normal within their range of movement. Within the limits of this range the sweep and the seeder can be adjusted somewhat lower or somewhat higher as occasion demands, without materially affecting the positions or relations of the hoes. There is no lock or fixed holding device between them. Notwithstanding the floating mounting of the hoe frame, however, the operator can, at any time, without being required to remove any stop or open any lock, instantly put the hoes to any higher or lower position to correspond with the workings of the sweep and the seeder, and to the conditions of the soil surface and owing to the fact that the lever 33 and the hoe frame have a limited range of movement independently of each other the lever may be operated under favorable conditions either to raise or to lower the hoes, as above pointed out.

The hoes and hoe frame are close to the axle and, therefore, close to the seeding devices, but the side bars 15 of the hoe frame are extended to a line so far forward of the axle that the hoes have a long radius of swing and, therefore, the shovels are, practically, constantly maintained at an approximately fixed angle to the surface of the soil.

What I claim is:

1. In a planting mechanism of the class described, the combination with a main frame, of a rearwardly disposed hoe carrying support comprising a lever normally having free swinging movement supported by the main frame, operating connections comprising a link pivotally connected between said lever and the hoe carrying support arranged to permit said support to move freely vertically independently of said lever when the hoes are in any working position, and to allow said lever a limited range of movement without affecting the position of said support, said connections being adapted to be actuated by movement of said lever either to elevate the hoe carrying frame from its operative position and lock it in its elevated position by said link swinging over a dead center position, or to apply downward pressure to said hoe carrying frame when it is in its operative position.

2. In a planting mechanism of the class described, the combination with a main frame, of a vertically movable hoe carrying support, a member operable manually to lift, or to apply downward pressure to the hoe support, intermediate means comprising a link connecting said member with the hoe carrying support, said intermediate means being arranged to permit a limited range of movement of said hoe carrying support and of said member independently of each other, and a stop on the main frame adapted to cooperate with said link to hold the hoe carrying support and the link against lowering movement when the hoe carrying support is in its uppermost position, said link being movable by said member to permit the hoe carrying support to descend freely under gravity to its lowermost position.

3. In an implement of the class described, the combination with a main frame having a rigid non-flexible construction, and a reversible foot actuated power device mounted thereon, of a tool carrying frame connected with the main frame to normally move freely vertically independently of said power device through the range of a series of relatively low positions in either of which the tool can normally operate, and also to be elevated to an inactive position by operation of said power device, a link operatively connected with said power device and with the tool carrying frame, and operable by said power device to positively apply downward pressure to the latter frame, and a stopping device on the main frame with which said link engages when the tool carrying frame is elevated, said link being operable by said power device to move the tool carrying frame from its operative position where the tool is held inactive.

4. In a mechanism of the class described, the combination with a main frame, of a hoe carrying frame, a reversible two-part foot actuated power device adapted when not being operated to have free swinging movement on the main frame, one part thereof being movable relatively to the other inactively between limits, means tending to hold said parts in a fixed position relative to each other, and crank and link devices connecting one part of said power device with the hoe carrying frame and operable by the other part thereof to positively apply downward pressure thereto, said devices being movable by operation of the latter part of said power device to lift said hoe carrying frame to its upper inactive position, and cooperating with said power device to lock the latter frame in such position.

5. In an agricultural implement, the combination with a main frame, of a hoe carrying frame connected therewith to swing vertically, a rock shaft mounted on the main frame and having a crank connection with said hoe carrying frame, and a lever pivotally supported by and having a lost motion connection with said rock shaft, said lever being operable to rock said shaft in either direction, either to apply downward pressure to said hoe carrying frame, or to elevate the same.

6. In an agricultural implement, the combination with a main frame, of a hoe carrying frame connected with said main frame to float freely relatively thereto when in any working position, a lever mounted on the main frame, and means connected with the hoe carrying frame and operable by movement of said lever in one direction or the other either to raise said hoe carrying frame, or to positively apply downward pressure thereto, said lever having a limited range of movement without affecting the position of said hoe carrying frame.

7. In an agricultural implement, the combination with a main frame, of an implement carrying frame connected therewith to swing vertically, an actuating member pivotally mounted on said main frame, a foot pedal pivotally mounted for movement relatively to said actuating member, positive end stops limiting the relative movement between said foot pedal and said actuating member, whereby depression of said foot pedal is operative to transmit swinging movement to said actuating member in either direction, said actuating member and said foot pedal normally swinging freely on said main frame, a crank arm extending from said actuating member, and a link pivotally connected at one end with the crank arm and at its other end with said implement carrying frame, the pivot connection between said crank arm and link being movable over center from a normal position on one side of the vertical axial plane of said crank arm to a position on the other side thereof in the raising of said implement carrying frame to its inoperative position whereby the latter is automatically locked in such position.

8. In a planting mechanism of the class described, the combination with a main frame, of a hoe carrying support freely movable vertically independently thereof, and a lifting device comprising a two-part lever supported by the main frame and normally swinging freely on said main frame, and connections between one part of said lever and said support, the parts of said lever being movable relative to each other between limits, spring means operatively connected between said parts, one part of said lever and the hoe carrying support being arranged to be actuated by the other part of said lever either to elevate said support out of its operative position, or to positively apply downward pressure thereto when it is in its operative position, said lifting device being movable into position to hold said hoe carrying support in its elevated position.

In testimony whereof, I affix my signature.

CHARLES E. WHITE.

CERTIFICATE OF CORRECTION.

Patent No. 1,741,216. Granted December 31, 1929, to

CHARLES E. WHITE.

It is hereby certified that error appears in the printed specification of the above numbered patent requiring correction as follows: Page 1, line 36, for the misspelled word "wav" read "way"; page 3, line 19, strike out the words "frame are normally free and accommodate" and insert instead "frame float or are normally free to rise and fall so as to accommodate"; and that the said Letters Patent should be read with these corrections therein that the same may conform to the record of the case in the Patent Office.

Signed and sealed this 11th day of February, A. D. 1930.

(Seal)

M. J. Moore,
Acting Commissioner of Patents.